(12) United States Patent
Fuchsius

(10) Patent No.: US 9,861,088 B1
(45) Date of Patent: Jan. 9, 2018

(54) FISHING POLE AND LURE COVER

(71) Applicant: Scott Fuchsius, Sayville, NY (US)

(72) Inventor: Scott Fuchsius, Sayville, NY (US)

( * ) Notice: Subject to any disclaimer, the term of this patent is extended or adjusted under 35 U.S.C. 154(b) by 0 days.

(21) Appl. No.: 15/437,516

(22) Filed: Feb. 21, 2017

(51) Int. Cl.
*A01K 97/10* (2006.01)
*A01K 97/08* (2006.01)
*B60R 9/08* (2006.01)

(52) U.S. Cl.
CPC .............. *A01K 97/10* (2013.01); *A01K 97/08* (2013.01); *B60R 9/08* (2013.01)

(58) Field of Classification Search
CPC ............................... B60R 2011/005–2011/0063
USPC ......................................... 224/562, 555, 558
See application file for complete search history.

(56) References Cited

U.S. PATENT DOCUMENTS

| | | | | |
|---|---|---|---|---|
| 2,767,502 A | * | 10/1956 | Reynolds | A01K 97/06 43/25.2 |
| 3,641,697 A | * | 2/1972 | Heidtman | A01K 97/08 206/315.11 |
| 4,294,299 A | * | 10/1981 | Dorsen | A45C 3/06 150/123 |
| 4,295,618 A | * | 10/1981 | Morota | F16L 3/13 248/73 |
| D275,338 S | * | 9/1984 | Bailey | D22/134 |
| 4,653,716 A | * | 3/1987 | Sakaguchi | A01K 97/10 248/316.5 |
| 4,920,683 A | | 5/1990 | Weber | |
| 4,944,111 A | | 7/1990 | Daniel | |
| D355,071 S | | 2/1995 | Stull | |
| 5,425,194 A | * | 6/1995 | Miller | A01K 97/08 206/315.11 |
| 5,588,245 A | | 12/1996 | Vance | |
| 5,845,809 A | * | 12/1998 | Garrett | F16K 35/10 220/728 |
| 6,023,876 A | | 2/2000 | Haddad | |
| 6,085,455 A | | 7/2000 | Bracken | |
| 6,606,814 B1 | | 8/2003 | Weaver | |

* cited by examiner

*Primary Examiner* — Brian D Nash

(57) ABSTRACT

The fishing pole and lure cover is an accessory used to store a fishing pole during transport. Moreover, the fishing pole and lure cover supports both the fishing pole and lure via a pipe member that opens via a hinge to enable the fishing pole to be inserted into or removed from as needed. The pipe member is further defined as a bottom half conduit and a top half conduit. The bottom half conduit is pivotably attached to the top half conduit via at least one hinge. A foam lining is provided on an inner surface of both the bottom half conduit and the top half conduit. The foam lining is configured to secure the fishing rod in place when the top half conduit is secured to the bottom half conduit. A clasp is provided in order to lock the top half conduit against the bottom half conduit.

2 Claims, 4 Drawing Sheets

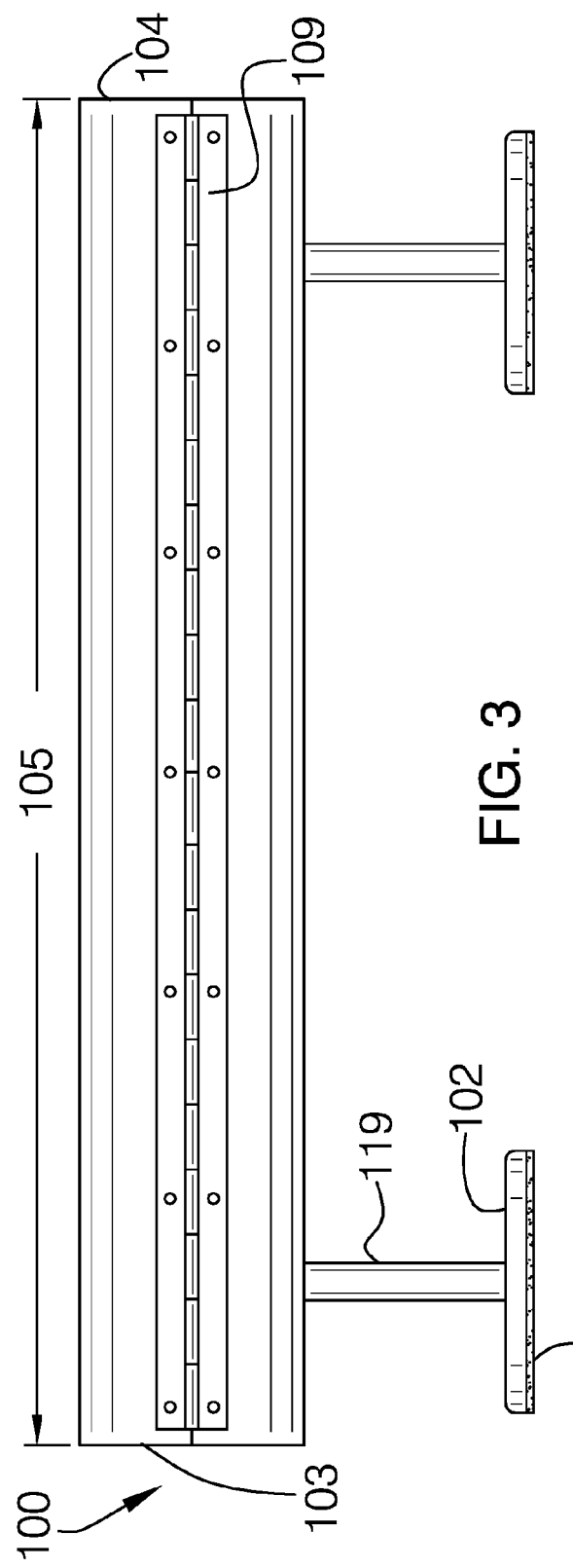
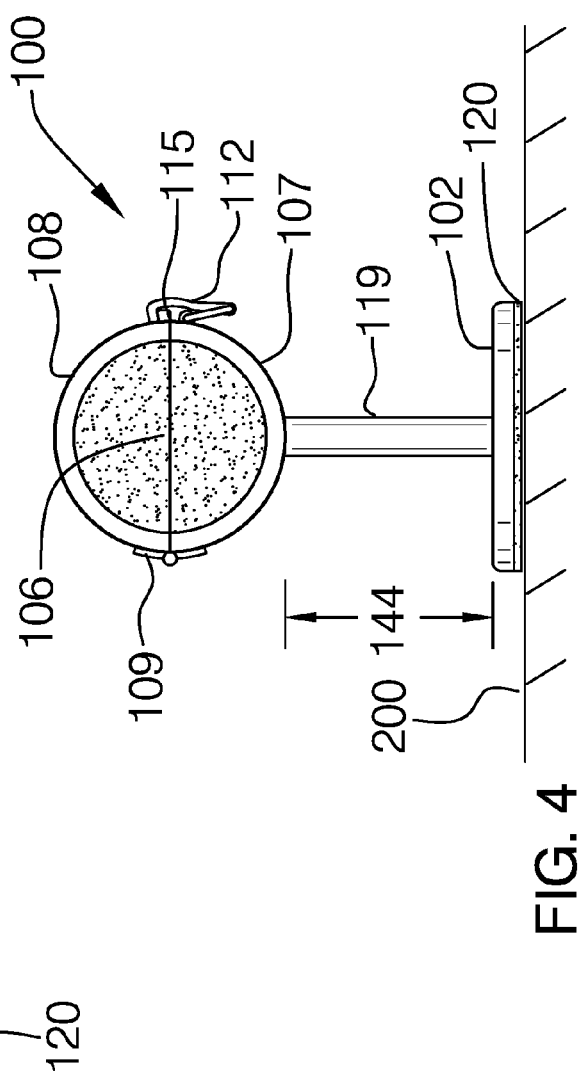
FIG. 3
FIG. 4

FISHING POLE AND LURE COVER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of fishing equipment, more specifically, a fishing pole and lure cover.

SUMMARY OF INVENTION

The fishing pole and lure cover is an accessory used to store a fishing pole during transport. Moreover, the fishing pole and lure cover supports both the fishing pole and lure via a pipe member that opens via a hinge to enable the fishing pole to be inserted into or removed from as needed. The pipe member is further defined as a bottom half conduit and a top half conduit. The bottom half conduit is pivotably attached to the top half conduit via at least one hinge. A foam lining is provided on an inner surface of both the bottom half conduit and the top half conduit. The foam lining is configured to secure the fishing rod in place when the top half conduit is secured to the bottom half conduit. A clasp is provided in order to lock the top half conduit against the bottom half conduit. A pair of magnet members extends down from the bottom half conduit. The pair of magnet members is configured to secure the fishing pole and lure cover against a ferrous surface, such as a vehicle.

It is an object of the invention to provide a device that supports a fishing rod whilst in transport.

An even further object of the invention is to provide a device that includes a foam core that is built into the pipe member in order to restrict movement of the fishing rod when inserted within.

Another object of the invention is to provide magnets to secure the invention to a ferrous surface, which may be on a vehicle.

These together with additional objects, features and advantages of the fishing pole and lure cover will be readily apparent to those of ordinary skill in the art upon reading the following detailed description of the presently preferred, but nonetheless illustrative, embodiments when taken in conjunction with the accompanying drawings.

In this respect, before explaining the current embodiments of the fishing pole and lure cover in detail, it is to be understood that the fishing pole and lure cover is not limited in its application to the details of the construction and arrangements of the components set forth in the following description or illustration. Those skilled in the art will appreciate that the concept of this disclosure may be readily utilized as a basis for the design of other structures, methods, and systems for carrying out the several purposes of the fishing pole and lure cover.

It is therefore important that the claims be regarded as including such equivalent construction insofar as they do not depart from the spirit and scope of the fishing pole and lure cover. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 3 is a rear, side view of an embodiment of the disclosure.

FIG. 4 is a side view of an embodiment of the disclosure.

DETAILED DESCRIPTION OF THE EMBODIMENT

Figure 1:
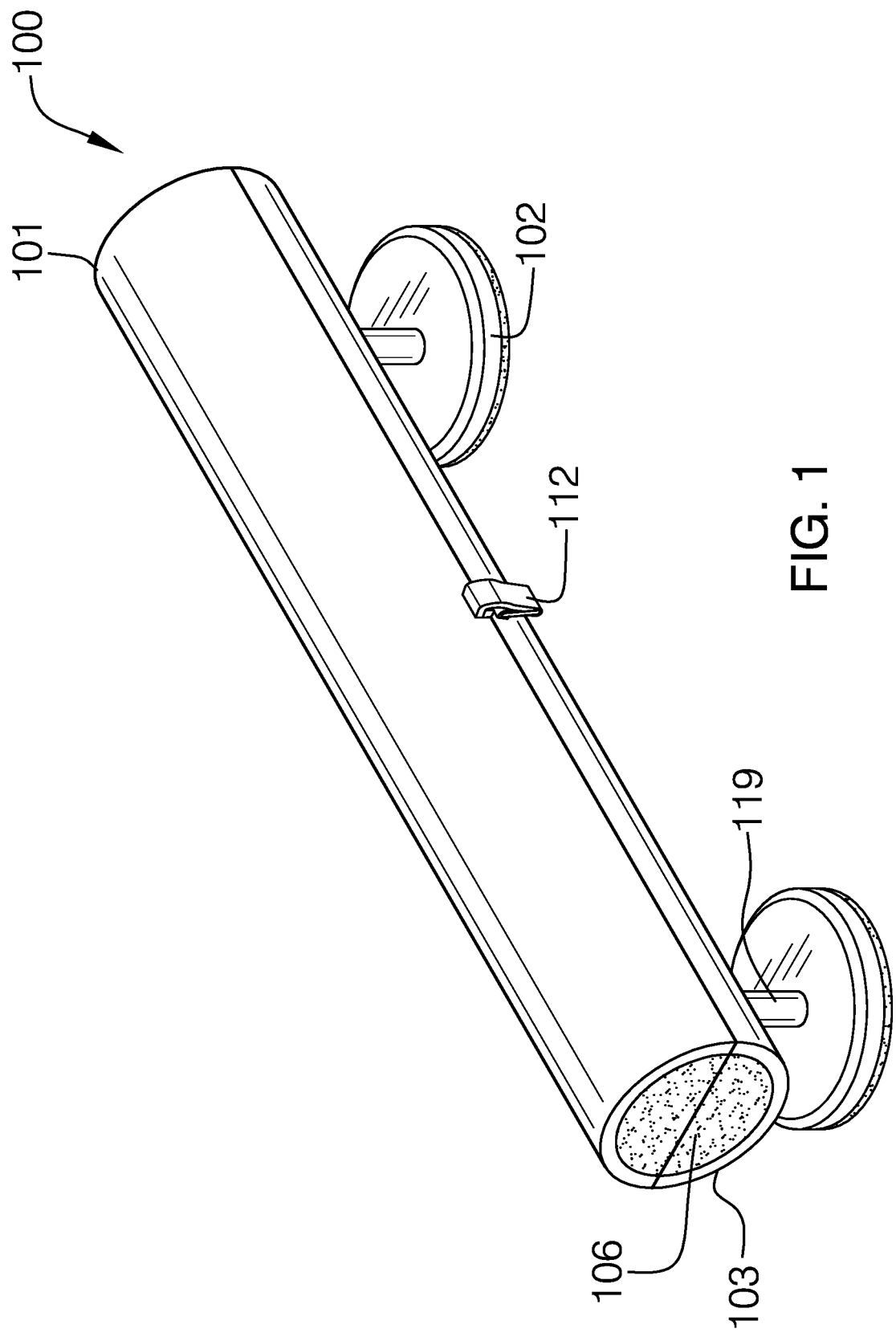
FIG. 1 is a perspective view of an embodiment of the disclosure.
Figure 2:
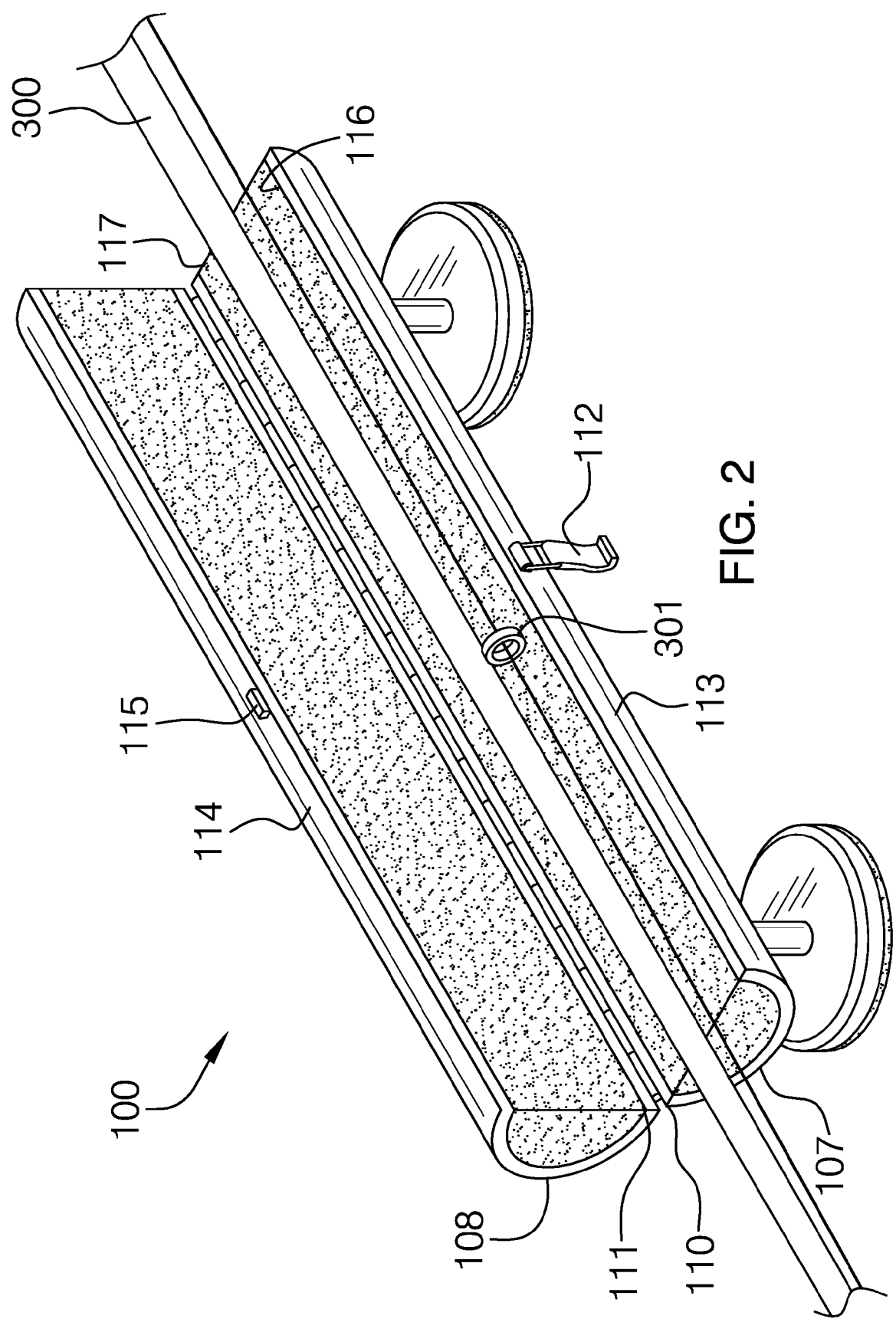
FIG. 2 is another perspective view of an embodiment of the disclosure.
Figure 5:
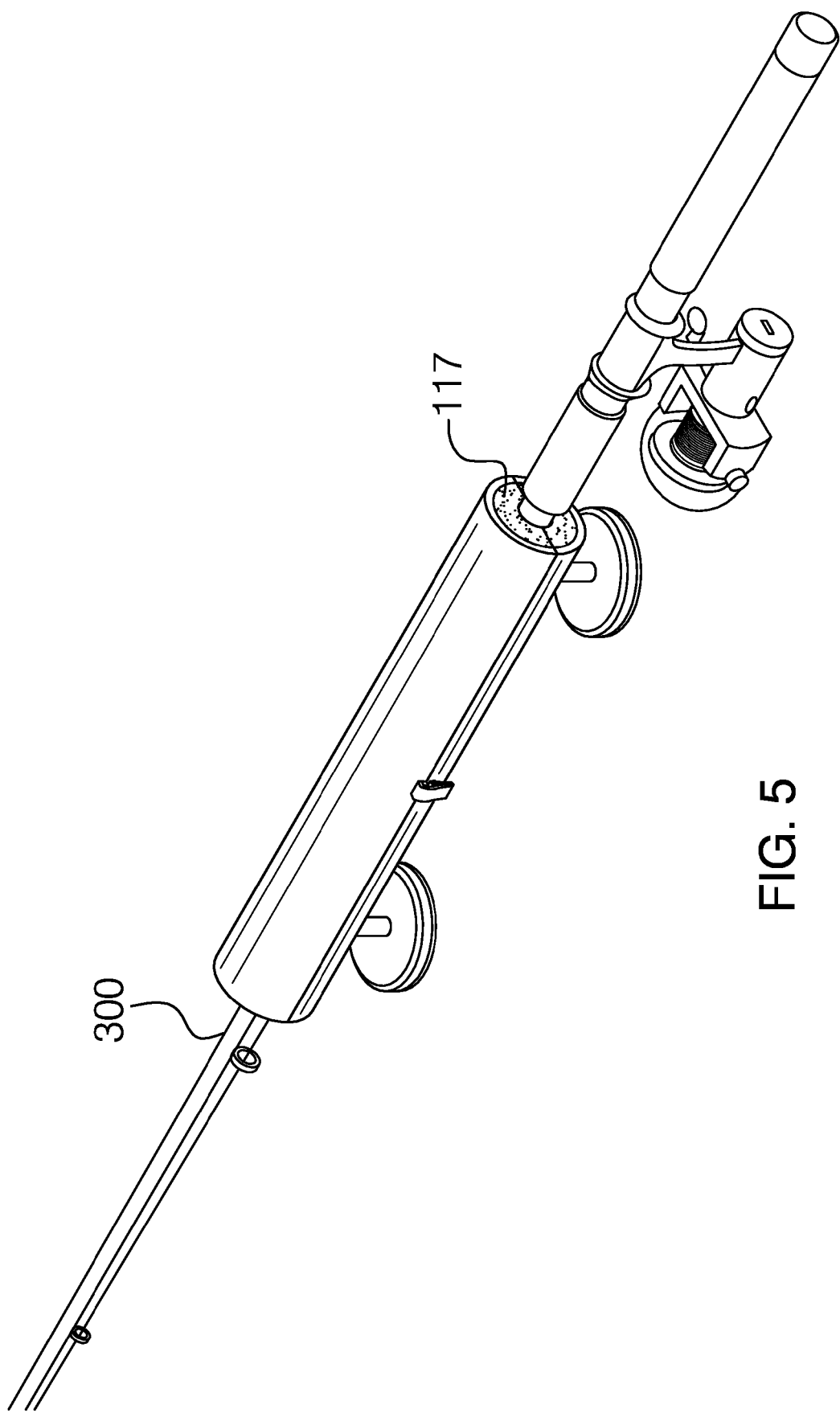
FIG. 5 is a perspective view of an embodiment of the disclosure in use.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 5.

The fishing pole and lure cover 100 (hereinafter invention) comprises a tube member 101 that includes at least one securing member 102. The at least one securing member 102 is configured to interface with a support surface 200. It shall be noted that the support surface 200 is ideally a surface of a vehicle the at least one securing member 102 is ideally a magnet. The general premise of the invention 100 is to secure the invention 100 on the support surface in a horizontal orientation.

The tube member 101 is further defined with a first end 103 and a second end 104. The tube member 101 may be made of a plurality of materials comprising a plastic (PVC), metal, wood, carbon fiber composite, etc. A tube length 105 spans from the first end 103 to the second end 104. The tube length 105 may range from not less than 2 inches, and not more than 20 feet. Ideally, the tube length 105 would be 12 inches. The tube member 101 implies a cylindrical construction, which is to say that a side surface 106 is provided at the first end 103 as well as at the second end 104. The tube member 101 may be further defined with a bottom conduit half 107 and a top conduit half 108. The bottom conduit half 107 interfaces with the top conduit half 108 to form the tube member 101 as depicted in FIGS. 1, 3, and 4.

The top conduit half 108 pivots with respect to the bottom conduit half 107 via at least one hinge 109. The at least one hinge 109 is provided along a bottom, rear conduit edge 110 of the bottom conduit half 107. The at least one hinge 109 is also provided along a top, rear conduit edge 111 of the top conduit half 108. The at least one hinge 109 enables the tube member 101 to open up from an enclosed position (see FIG. 1) to an exposed position (see FIG. 2). Moreover, the at least one hinge 109 may extend along the tube length 105 of the tube member 101. This is to say that the at least one hinge 109 may be a single hinge that is actually a piano hinge. However, the at least one hinge 109 may be equal to or less than the tube length 105. Moreover, the at least one hinge 109 may involve a plurality of hinges that are linearly aligned along the tube member 101.

The tube member 101 may also include a clasp member 112 that works to secure the tube member 101 in the enclosed position of FIG. 1. The clasp member 112 is provided on a bottom outer surface 113 of the bottom conduit half 107 as well as on a top outer surface 114 of the top conduit half 108. The clasp member 112 includes a clasp catch 115 that is positioned on the top outer surface 114 of the top conduit half 108. The clasp catch 115 works with the clasp member 112 to secure the tube member 101 in the enclosed position.

The bottom conduit half 107 and the top conduit half 108 are each further defined with an inner surface 116. The inner surface 116 is adorned with a foam member 117 that provides greater security of use with a fishing rod 300. The foam member 117 is configured to interface with the fishing rod 300. The foam member 117 may be further defined as two hemi-cylindrically-shaped objects that are each aligned with and affixed to the inner surfaces 116 of the bottom conduit half 107 and the top conduit half 108.

The bottom conduit half 107 includes armatures 118 that extend downwardly. The armatures 118 are each affixed to the at least one securing member 102. The at least one securing member 102 may include a pad member 120 distal of the tube member 101. The pad member 120 is used to prevent scratching or marring to the support surface 200. The armatures 118 extend down an armature length 144, which is not more than 3 inches.

In use, the fishing pole 300 comes to rest within the tube member 101. It shall be noted that at least one fishing lure 301 (either attached or un-attached) may also be secured within the tube member 101. The at least one fishing lure 301 is able to lie adjacent to the fishing pole 300 within the tube member 101. The foam member 117 is made of a flexible material, which cushions around the at least one fishing lure 301 as well as the fishing pole 300. In use, the invention 100 is horizontal with the support surface 200. Moreover, the fishing pole 300 and the at least one fishing lure 301 are also horizontal with respect to the support surface 200.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A fishing storage and support accessory comprising:
   a tube member that is configured to receive a fishing rod therein;
   wherein the tube member is configured to support said fishing rod in a horizontal orientation with respect to a support surface;
   wherein the tube member includes at least one securing member;
   wherein the at least one securing member is configured to interface with the support surface;
   wherein the tube member is further defined with a first end and a second end;
   wherein the tube length spans from the first end to the second end;
   wherein the tube length ranges from not less than 2 inches, and not more than 20 feet;
   wherein the tube member is further defined with a side surface that is provided on the first end as well as at the second end;
   wherein the tube member is further defined with a bottom conduit half and a top conduit half;
   wherein the bottom conduit half interfaces with the top conduit half to form the tube member;
   wherein the top conduit half pivots with respect to the bottom conduit half via at least one hinge;
   wherein the at least one hinge is provided along a bottom, rear conduit edge of the bottom conduit half;
   wherein the at least one hinge is also provided along a top, rear conduit edge of the top conduit half;
   wherein the at least one hinge enables the tube member to open up from an enclosed position to an exposed position;
   wherein the at least one hinge extends along the tube length of the tube member;
   wherein the tube member also includes a clasp member that works to secure the tube member in the enclosed position;
   wherein the clasp member is provided on a bottom outer surface of the bottom conduit half;
   wherein the clasp member includes a clasp catch that is positioned on a top outer surface of the top conduit half;
   wherein the clasp catch works with the clasp member to secure the tube member in the enclosed position;
   wherein the bottom conduit half and the top conduit half are each further defined with an inner surface;
   wherein the inner surface is adorned with a foam member that provides greater security of use with the fishing rod;
   wherein the foam member is configured to interface with the fishing rod and at least one fishing lure;
   wherein the foam member is further defined as two hemi-cylindrically-shaped objects that are each aligned with and affixed to the inner surfaces of the bottom conduit half and the top conduit half;
   wherein the bottom conduit half includes armatures that extend downwardly;

wherein the armatures are each affixed to the at least one securing member;

wherein the at least one securing member includes a pad member distal of the tube member;

wherein the pad member is used to prevent scratching or marring to the support surface.

2. The fishing accessory according to claim 1 wherein the armatures extend down an armature length, which is not more than 3 inches.

* * * * *